(12) United States Patent
Marutani et al.

(10) Patent No.: US 8,920,699 B2
(45) Date of Patent: Dec. 30, 2014

(54) PROCESS FOR PRODUCING MOLDED PRODUCT, AND HEAT-EXCHANGE MEMBRANE ELEMENT

(75) Inventors: Kazuhiro Marutani, Tokyo (JP); Keiichi Yamakawa, Tokyo (JP); Takashi Imai, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 811 days.

(21) Appl. No.: 13/127,554

(22) PCT Filed: Nov. 4, 2009

(86) PCT No.: PCT/JP2009/068815
§ 371 (c)(1),
(2), (4) Date: Jul. 13, 2011

(87) PCT Pub. No.: WO2010/053087
PCT Pub. Date: May 14, 2010

(65) Prior Publication Data
US 2011/0259572 A1  Oct. 27, 2011

(30) Foreign Application Priority Data
Nov. 7, 2008  (JP) .................................. 2008-286477

(51) Int. Cl.
| | |
|---|---|
| *B29C 45/16* | (2006.01) |
| *B29C 45/14* | (2006.01) |
| *B29C 45/00* | (2006.01) |
| *F28D 21/00* | (2006.01) |
| *F28F 3/08* | (2006.01) |
| *F28F 21/06* | (2006.01) |

(52) U.S. Cl.
CPC ....... *B29C 45/14631* (2013.01); *B29C 45/0055* (2013.01); *B29C 45/14795* (2013.01); *B29C 45/14827* (2013.01); *B29C 45/14836* (2013.01); *F28D 21/0015* (2013.01); *F28F 3/08* (2013.01); *F28F 21/065* (2013.01); *B29C 45/14336* (2013.01)
USPC ........................................ 264/279; 264/271.1

(58) Field of Classification Search
USPC ...................... 264/334, 271.1, 279
See application file for complete search history.

(56) References Cited

FOREIGN PATENT DOCUMENTS

| | | |
|---|---|---|
| JP | 2001-270293 | 10/2001 |
| JP | 2001270293 A | * 10/2001 |
| JP | 2003-97831 | 4/2003 |
| JP | 2008-89199 | 4/2008 |

OTHER PUBLICATIONS

Men et al., JP 2001-270293 A, Machine Translation, Oct. 2, 2001.*
International Search Report from JP2009/068815.

* cited by examiner

*Primary Examiner* — Galen Hauth
(74) *Attorney, Agent, or Firm* — Amy L. Miller

(57) ABSTRACT

A molded product including a film bonded to a resin frame is produced by a method including: 1) reinforcing the film with a solvent-soluble or solvent-disintegrable reinforcing layer; 2) inserting the reinforced film in an injection mold; 3) feeding a resin to the mold to attach a frame body to the reinforced film while injection molding the resin frame; and 4) treating the resulting injection molded product with a solvent to remove the reinforcing layer. This production process can establish a technique capable of bonding (integrally molding) the film solely to the frame body, regardless of the size of the film. The film may preferably be an expanded porous polytetrafluoroethylene film, and the moisture-permeable resin may preferably be combined with the expanded porous polytetrafluoroethylene film.

9 Claims, 5 Drawing Sheets

(a)　　(b)　　(c)　　(d)

(a)

(b)

supply air        exhaust air (a)

(b)

(d)

(c)

(b)

(a)

(a)

(b)

PROCESS FOR PRODUCING MOLDED PRODUCT, AND HEAT-EXCHANGE MEMBRANE ELEMENT

TECHNICAL FIELD

The present invention relates to a method of bonding a film to a resin frame body, and preferably relates to a technique of producing a heat-exchange membrane element by bonding a moisture-permeable film to a resin frame body.

BACKGROUND ART

When an interior of a room is heated or cooled, or is ventilated, temperature (sensible heat) and humidity (latent heat) are exchanged (total heat exchange) between fresh air supplied to the interior (supply air) and air exhausted from the interior (exhaust air), via a heat-exchange membrane.

In total heat exchange, for example, a heat-exchange membrane element is used, which includes a heat-exchange membrane and a resin frame body for supporting the membrane (e.g., Patent Document 1). FIGS. 1(a) and 1(b) are schematic perspective views of a membrane element and a total heat exchanger using the membrane elements, both of which are introduced as a conventional technique in Patent Document 1. FIGS. 2(a), 2(b), and 2(c) are schematic perspective views of membrane elements and a total heat exchanger using the membrane elements, both of which are introduced as an inventive example in Patent Document 1.

In the example of FIG. 1, a heat-exchange membrane element 41 comprises a heat-exchange membrane 11 and a resin frame body 21, both of which are separately produced. The resin frame body 21 includes two or more rod-like spacers (ribs) 31 formed in parallel with one another, and portions (parallel portions) 25 of the frame body 21, which are parallel to the rod-like spacers, are also formed so as to have thicknesses similar to (or greater than) those of the rod-like spacers 31. A total heat exchanger 51 can be formed by alternately stacking the resin frame bodies 21 and the heat-exchange membranes 11 so that the directions of the parallel portions 25 (and the rod-like spacers 31) are alternately changed. In the total heat exchanger 51, the parallel portions 25 separate a supply air flow path and an exhaust air flow path from each other, so as to allow total heat exchange between supply air and exhaust air via the heat-exchange membrane 11.

Further, in the example of FIG. 2, a pair of first and second heat-exchange membrane elements 42a and 42b is used, and a total heat exchanger 52 is formed by alternately stacking these elements. More specifically, the first heat-exchange membrane element 42a comprises a heat-exchange membrane 11 and a resin frame body 22a integrally molded with the membrane. Further, on one side of the heat-exchange membrane 11, two or more rod-like spacers (ribs) 32a are formed in parallel with one another, and also on the other side of the heat-exchange membrane 11, two or more rod-like spacers (ribs) 33a are formed in parallel with one another. The spacers 32a on the one side are orthogonal to the spacers 33a on the other side. In addition, portions (parallel portions A) 26a of the frame body 22a, which are parallel to the rod-like spacers 32a on the one side, are formed so as to have thicknesses similar to (or greater than) those of the parallel rod-like spacers 32a. Further, portions (parallel portion B) 27a parallel to the rod-like spacers 33a on the other side are also formed so as to have thicknesses similar to (or greater than) those of the parallel rod-like spacers 33a.

The second heat-exchange membrane element 42b has a structure similar to the first heat-exchange membrane element 42a. Further, in the spacers of the second heat-exchange membrane element 42b, second engaging portions 34b for positioning are formed. Accordingly, the second engaging portions 34b are engaged with first engaging portions 34a likewise formed in the first heat-exchange membrane element 42a, so as to prevent the positions of the elements 42a and 42b from deviating from each other. When the total heat exchanger 52 is formed, the first and second heat-exchange membrane elements 42a and 42b are alternately stacked so that the directions of the spacers (ribs) 32a and 32b, and 33a and 33b, which are opposed to one another, are aligned.

Also in the heat exchanger 52 of FIG. 2, the parallel portions 26a, 26b, 27a, and 27b separate a supply air flow path and an exhaust air flow path from each other, so as to allow total heat exchange between supply air and exhaust air via the heat exchange membrane 11.

An ordinary plastic film or metal foil allows the exchange of temperature (sensible heat), but does not allow the exchange of humidity (latent heat), and therefore, it cannot be used as a total heat exchange membrane. Thus, paper is used as a total heat exchange membrane in Patent Document 1, and a paper base material is disclosed also in Patent Document 2. A paper base material has the advantage of a high latent heat exchange rate, but has a low resistance to dew condensation. Thus, the total heat exchange membrane (paper) may be torn, if condensed dew is frozen.

Further, for example, as shown in Patent Document 3, a porous resin film such as an expanded porous polytetrafluoroethylene film is also used as a total heat exchange membrane. A porous resin film has an excellent resistance to dew condensation.

PRIOR ART DOCUMENTS

Patent Document

Patent Document 1: Japanese Patent Laid-open Publication No. 2007-285691
Patent Document 2: Japanese Patent Laid-open Publication No. 2007-119969
Patent Document 3: Japanese Patent Laid-open Publication No. Hei 7-133994
Patent Document 2: Japanese Patent Laid-open Publication No. Hei 4-45812
Patent Document 2: Japanese Patent Laid-open Publication No. 2003-97831

DISCLOSURE OF THE INVENTION

Problems to be Solved by the Invention

Patent Document 3 discloses an example in which a porous resin film is used without modification. It is expected that if the porous resin film is bonded to the frame body as shown in Patent Document 1 and the resulting product is used as a membrane element, this makes it possible to facilitate the assembly of a heat exchanger. It is, however, not easy to attach the frame body to the porous resin film.

Although different in technical field and in the shape of a frame body from a heat exchange membrane, Patent Document 4 discloses, as a method of bonding a porous resin film to a frame body, an injection molding method in which a melted plastic is infiltrated into the peripheral portion of a polytetrafluoroethylene porous membrane, followed by solidifying the plastic. Patent Document 4, however, discloses a method of producing a vent filter, which has an extremely small membrane area and only needs to have a diameter of about 1 cm or smaller, and therefore, it is not possible to apply this method to a heat-exchange membrane, which has a large membrane area. A porous resin film may contract by heat during the injection molding of a frame body. Further, the resin pressure during the injection molding may sweep away the porous resin film as well, and therefore, the shape of the membrane may be lost, or the membrane may be torn. Accordingly, when a porous resin film having a large membrane area is used, it is essential to reinforce the porous resin film in advance by a nonwoven fabric. For example, Patent Document 5 relates to a hollow gas-liquid separation element, which is different in the shape of a frame body from a flat heat-exchange membrane element, but has a membrane area as large as a flat heat-exchange membrane. Thus, insert molding is carried out after a nonwoven fabric is layered on a porous resin film.

As described above, when a porous resin film having a large area is attached to a frame body, it is necessary to reinforce the porous resin film by a nonwoven fabric or others. If, however, such a reinforcing layer is stacked, the latent heat exchange rate of the porous resin film decreases.

In view of the above circumstances, it is an object of the present invention to establish a technique capable of bonding (integrally molding) a film solely to (with) a frame body, regardless of the size of the film.

It is a preferred object of the present invention to provide a heat-exchange membrane element having an excellent resistance to dew condensation and excellent latent heat exchange properties (moisture-permeable properties).

Means of Solving the Problems

As a result of earnest studies to solve the above problems, the present inventors have found that it is possible to bond (integrally mold) a film solely to (with) a frame body, regardless of the area of the film, by stacking a solvent-soluble or solvent-disintegratable reinforcing layer on the film in advance so as to reinforce the film, and, after a frame body is injection-molded onto the film, removing the reinforcing layer with a solvent, and the present inventors have completed the present invention.

That is, the process for producing a molded product comprising a film bonded to a resin frame body according to the present invention comprises: 1) reinforcing the film with a solvent-soluble or solvent-disintegrable reinforcing layer; 2) inserting the reinforced film (i.e., a layered product of the film and the reinforcing layer) in an injection mold; 3) feeding a resin to the mold to attach a frame body to the layered product while injection molding the resin frame; and 4) treating the resulting injection molded product with a solvent to remove the reinforcing layer. The film may preferably be an expanded porous polytetrafluoroethylene film, and the moisture-permeable resin may more preferably be combined with the expanded porous polytetrafluoroethylene film. The moisture-permeable resin may be, for example, a urethane resin, a cross-linked polyvinyl alcohol, an ion exchange fluororesin, or other resins. The film may have a thickness of about 0.5 µm to 100 µm. When the solvent is water, the reinforcing layer may be formed, for example, of a water-soluble fiber, or may be a formed product of a polyvinyl alcohol fiber or a paper formed of a pulp fiber capable of being finely dispersed in water. The layered product of the film and the reinforcing layer may desirably be inserted between a pair of molds for injection molding, and these both molds may desirably be each provided with a cavity for formation of a frame body and also with an engraved mold surface on an inner side than the cavity for formation of a frame body.

The present invention also includes a heat-exchange membrane element comprising an expanded porous polytetrafluoroethylene film bonded solely to a resin frame body by integral molding.

Effects of the Invention

According to the present invention, it is possible to bond (integrally mold) a film solely to (with) a frame body. If a molded product produced in such a manner is used as a heat-exchange membrane element, it is possible to achieve both a resistance to dew condensation and latent heat exchange properties (moisture-permeable properties).

MODE FOR CARRYING OUT THE INVENTION

The present invention will be described below in more detail by appropriate reference to the drawings. In this connection, the same components are designated by the same numerals, and are not redundantly described.

Figure 3:
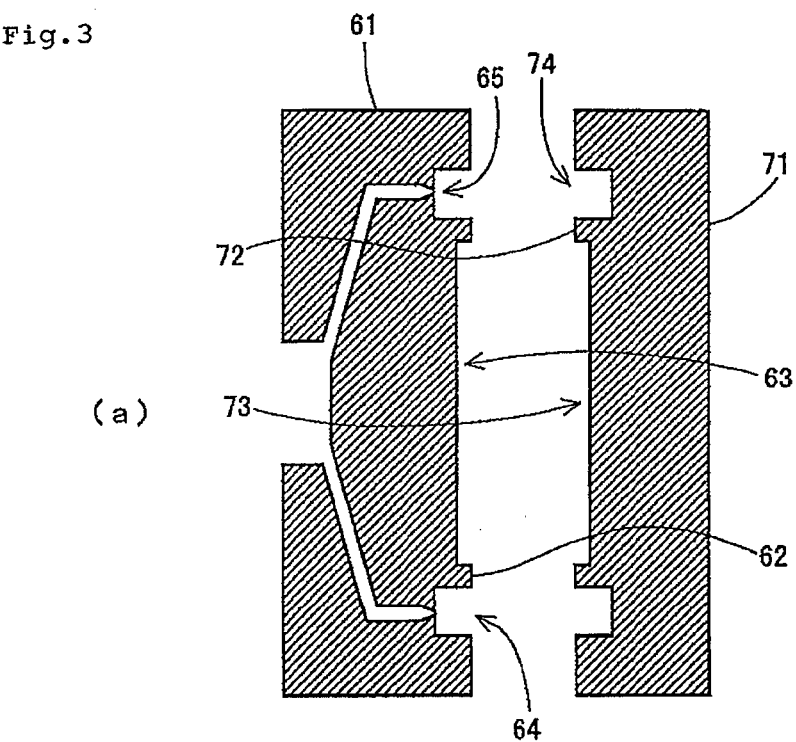
FIG. 3 is a schematic cross-sectional view showing one example of a mold which is used in the present invention.
Figure 3:
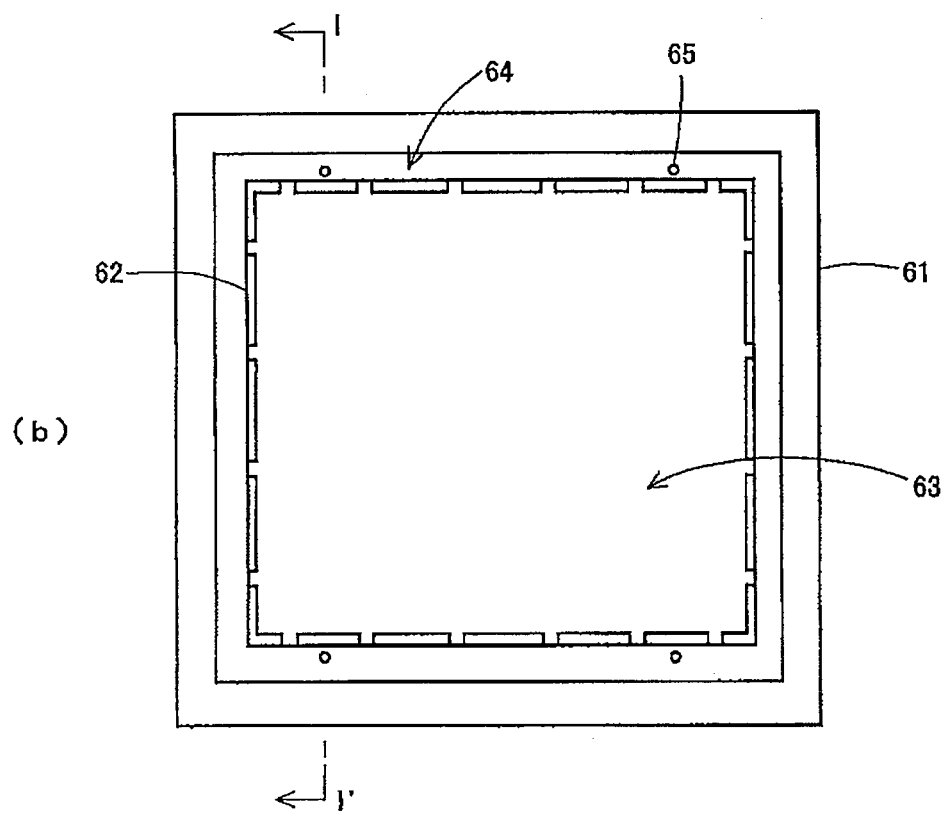
Figure 4:
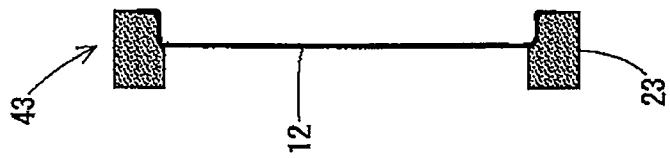
FIG. 4 is a schematic cross-sectional view showing one example of the production process of the present invention.
Figure 4:
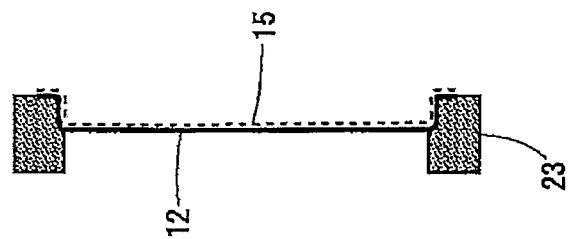
Figure 4:
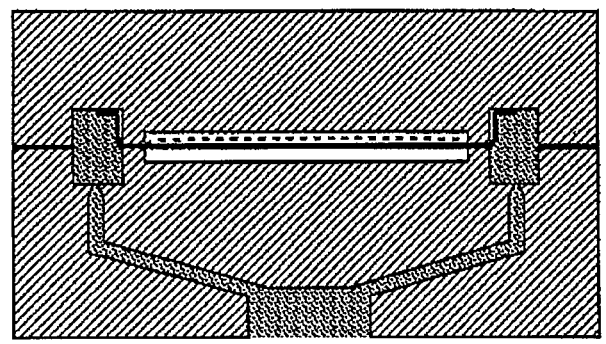
Figure 4:
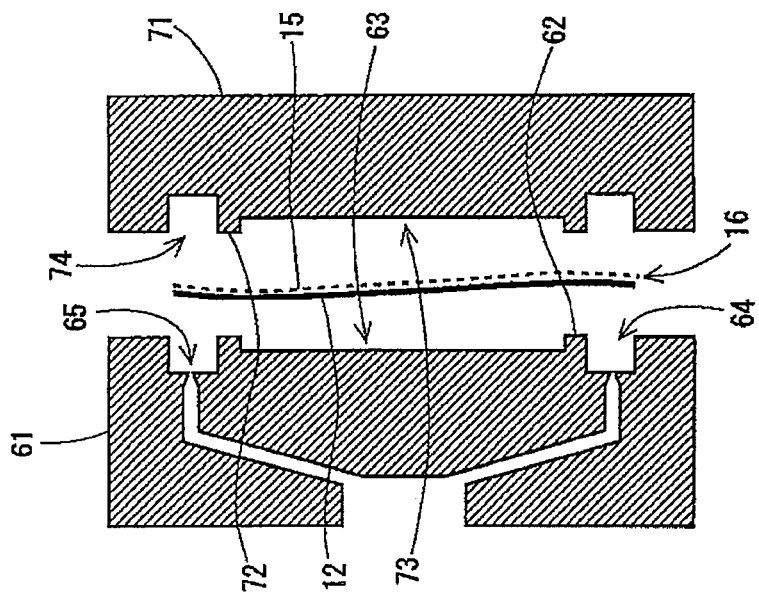
Figure 5:
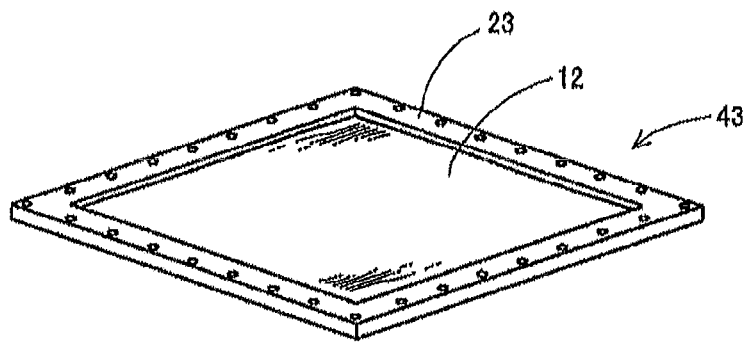
FIG. 5 is a schematic perspective view showing one example of a molded product which can be produced in the present invention.
Figure 5:
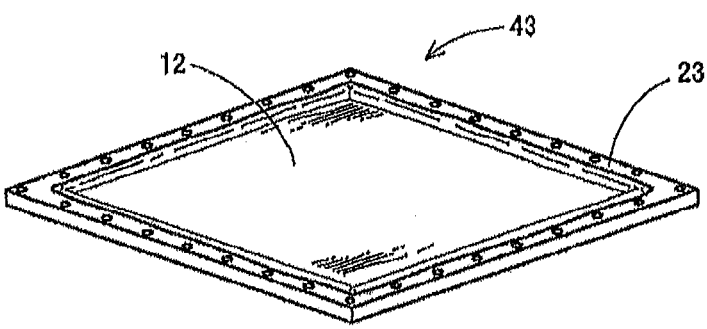

FIG. 3(*a*) is a schematic cross-sectional view showing a pair of injection molds used in the present invention when seen from the side. FIG. 3(*b*) is a front view of one of the molds. The cross-sectional view in FIG. 3(*a*) corresponds to a plane cut along line I-I' in FIG. 3(*b*). FIG. 4 is a cross-sectional view showing the steps of insert molding using the molds in FIG. 3. FIG. 5(*a*) is a schematic perspective view of the front side of a molded product obtained by the method in FIG. 4. FIG. 5(*b*) is a schematic perspective view showing the back side of the molded product.

In the production example of FIG. 4, a reinforced film (layered film) 16, which has been obtained by adhesively layering a film 12 and a solvent-soluble or solvent-disintegratable reinforcing layer 15, is inserted between a pair of injection molds 61 and 71 (FIG. 4(*a*)), and after the reinforced film 16 is fixed to the molds by appropriate means (e.g., pins, vacuuming), a resin for forming a frame body 23 is bonded to the reinforced film 16 while injected through one of the pair, i.e., the mold 61 (FIG. 4(*b*)), and after the molds are removed (FIG. 4(*c*)), the resulting product is treated with a solvent to remove the reinforcing layer 15 (FIG. 4(*d*)). The use of the reinforcing layer 15 makes it possible to prevent the film 12 from losing its shape, contracting, or being torn during the injection molding. Then, the reinforcing layer 15 is removed with a solvent after the molding. Thus, it is possible to produce a molded product 43 in which the film 12 is bonded solely to (integrally molded with) the frame body 23 (FIGS. 5(*a*) and 5(*b*)).

In the example shown in the above figures, a resin feed inlet 64 is formed in one of the pair, i.e., the mold 61. The resin may also be supplied through both the molds 61 and 71. Further, the molds 61 and 71 are provided with engraved mold surfaces 63 and 73 on inner sides than cavities 64 and 74 for the formation of a frame body, respectively. The portion between the cavity 64 and the engraved portion (hollow portion) 63, and the portion between the cavity 74 and the engraved portion (hollow portion) 73, protrude in a peak-like manner so as to serve as film holding portions 62 and 72, respectively. The formation of the engraved portions (hollow portions) 63 and 73 makes it possible to prevent the film 12 from making contact with the molds, and therefore, this makes it possible to prevent thermal damage of the film 12. The engraved portions (hollow portions) 63 and 73, however, are not always needed. For example, the engraved portions (hollow portions) 63 and 73 may have the same heights as those of the film holding portions 62 and 72, respectively, so as to hold the film in a planar manner.

The film 12, although it may be an appropriate film depending on the applications of the molded product 43 (e.g., filters (including vent filters), gas-liquid separation membranes, dehumidification membranes, humidification membranes, pervaporation membranes, heat-exchange membranes, ion-exchange membranes), may preferably be a film of which base material is a porous resin (particularly, expanded porous polytetrafluoroethylene). A porous resin, particularly an expanded porous polytetrafluoroethylene film, is very difficult to be subjected to insert molding without modification, because the porous resin film is extremely flexible, easily expandable, and easily shrinkable by heat. According to the present invention, however, it is possible to bond even such a film solely to a frame body by integral molding.

When the molded product 43 is used as an element for filters (including vent filters), a porous resin may be used without modification as the film 12. Further, when the molded product 43 is used for applications other than filters (particularly, gas-liquid separation membranes), a porous resin may be used without modification as the film 12; however, a composite film of, for example, a moisture-permeable resin and the porous resin film, may also be used as the film 12. The composite film may preferably be formed by layering the moisture-permeable resin on the porous resin film. More preferably, porous spaces inside the porous film are filled with the moisture-permeable resin in addition to, or instead of, the layering.

The average pore diameter and the porosity of the porous resin (particularly, expanded porous polytetrafluoroethylene) film may appropriately be set depending on the applications of the molded product. The average pore diameter may be, for example, about 0.05 µm to 10 µm, preferably about 0.1 µm to 5 µm, and the porosity may be, for example, about 30% to 97%, preferably about 50% to 95%, and more preferably about 70% to 90%.

The average pore diameter is a value obtained from the pore distribution (the volume distribution relative to the pore diameter). That is, the pore distribution was measured on the assumption that all the pores of the porous resin film were cylindrical, and a pore diameter corresponding to the median value of the pore volumes was determined as the average pore diameter. In the present invention, the average pore diameter was determined using a Coulter Porometer available from Coulter Electronics Ltd.

Further, the porosity of the porous resin film can be calculated, based on the following formula, using a bulk density D determined by measuring a mass W and a hole-including apparent volume V of the porous resin film (D=W/V in g/cm$^3$), and a density $D_{standard}$ (2.2 g/cm$^3$ in the case of polytetrafluoroethylene) when no holes are formed. The thickness used to calculate the volume V is determined, based on the average thickness measured with a dial thickness gauge (the measurements of the average thickness were carried out using "SM-1201" available from Teclock Corporation in the state where no load is applied other than the spring load of the gauge body).

$$\text{Porosity (\%)} = [1-(D/D_{standard})] \times 100$$

Examples of the moisture-permeable resin to be combined with the porous resin film may include resins of which repeating unit contains protic hydrophilic groups (protic hydrophilic resins), such as urethane resins, polystyrene sulfonates, cross-linked polyvinyl alcohols (e.g., cross-linked products by a mixture of glutaraldehyde and HCl, cross-linked products by formaldehyde, cross-linked products by blocked isocyanate), vinyl alcohol copolymers (e.g., ethylene-vinyl alcohol copolymers, tetrafluoroethylene-vinyl alcohol copolymers), and ion exchange resins, e.g., fluorinated ion exchange resins (e.g., "Nation (registered trademark)" available from E.I. du Pont de Nemours and Company, "Flemion (registered trademark)" available from Asahi Glass Co., Ltd.), divinylbenzene sulfonic acid copolymers, divinylbenzene carboxylic acid copolymers; and resins of which repeating unit contains aprotic hydrophilic groups (aprotic hydrophilic resins), such as polyethylene oxide, polyvinylpyridine, polyvinyl ether, polyvinylpyrrolidone, and pyrrolidone. These moisture-permeable resins may be used solely, or two or more of the moisture-permeable resins may also be used in combination. Preferred moisture-permeable resins are, for example, urethane resins, cross-linked polyvinyl alcohols, fluorinated ion exchange resins.

In the present description, the term "film" 12 is defined as a layer other than the reinforcing layer 15, and examples of the "film" 12 according to the present invention may include monolayer films (particularly, porous resin films), layered films obtained by layering two or more films (particularly, porous resin films), and products obtained by further layering a moisture-permeable resin on such monolayer or layered films (particularly, monolayer or layered porous resin films). Preferred films 12 are monolayer films which may be filled with a moisture-permeable resin, and products obtained by layering a moisture-permeable resin on monolayer films.

The thickness of the film 12 may be, for example, about 0.5 µm to 100 µm, preferably about 5 µm to 50 µm, and more preferably about 7 µm to 30 µm. Further, the area of the film 12 may be, for example, about 4 cm$^2$ to 10,000 cm$^2$, preferably about 10 cm$^2$ to 5,000 cm$^2$, and more preferably about 100 cm$^2$ to 3,000 cm$^2$.

In the example shown in the above figures, the reinforcing layer 15 is adhesively layered on the film 12. Alternatively, the reinforcing layer 15 can be layered on the film 12 by various methods, so long as the film 12 can be reinforced with the reinforcing layer 15. For example, the reinforcing layer 15 may be layered on the film 12 by thermal fusion bonding.

The method of adhesively layering the film 12 and the reinforcing layer 15, and the method of layering the film 12 and the reinforcing layer 15 by fusion bonding, are not particularly limited. For example, the film 12 and the reinforcing layer 15 may be layered and then allowed to pass though a heated roll for thermal fusion bonding.

The reinforcing layer 15 is not particularly limited, so long as the reinforcing layer 15 can be solvent-soluble or solvent-disintegratable and the film 12 can be reinforced (by layering). Examples of the reinforcing layer 15 may include formed products (e.g., sheets (including expanded sheets), and fiber formed products such as knitted fabrics, woven fabrics, nonwoven fabrics, and nets) obtained from solvent-soluble or solvent-disintegratable materials (e.g., resins, fibers), and nonwoven fabrics obtained by bonding solvent-resistant fibers with solvent-soluble or solvent-disintegratable materials. As a matter of course, examples of the reinforcing layer 15 may also include nonwoven fabrics obtained by bonding solvent-soluble or solvent-disintegratable fibers with solvent-soluble or solvent-disintegratable adhesives.

Various solvent-soluble or solvent-disintegratable materials and various solvent-resistant fibers can be used depending on the types of solvents (e.g., water, organic solvents, acids, alkalis). For example, when water is used as the solvent, examples of the solvent-soluble or solvent-disintegratable sheet formed product may include polyvinyl alcohol sheets and starch sheets (e.g., edible wafer papers). Examples of the solvent-soluble or solvent-disintegratable fiber formed product may include formed products of polyvinyl alcohol fibers (e.g., "Solublon (product name)" available from Aicello Chemical Co., Ltd., "Kuralon K-II" by Kuraray Co., Ltd.); and papers formed of pulp fibers capable of being finely dispersed in water (e.g., "Water-Soluble Paper (product name)" available from Nippon Paper Papylia Co., Ltd.).

Further, when water is used as the solvent, examples of the solvent-soluble or solvent-disintegratable adhesive material may include polyvinyl alcohol and starch paste. Examples of the solvent-resistant fiber may include polyester fibers, polyethylene fibers, polypropylene fibers, and nylon fibers.

Also when another type of solvent is used, the solvent-soluble or solvent-disintegratable material and the solvent-resistant fiber may appropriately be selected from publicly-known materials.

Figure 1:
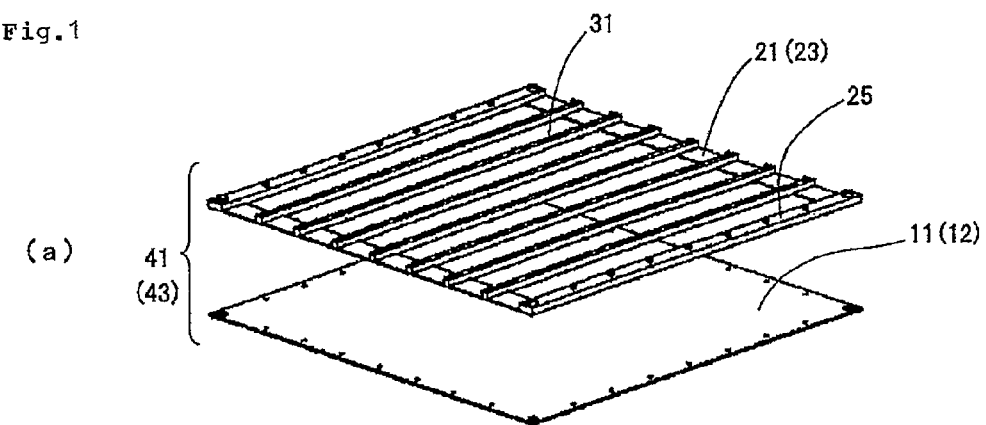
FIG. 1 is a schematic perspective view showing one example of the shape of a frame body which can be produced in the present invention.
Figure 1:
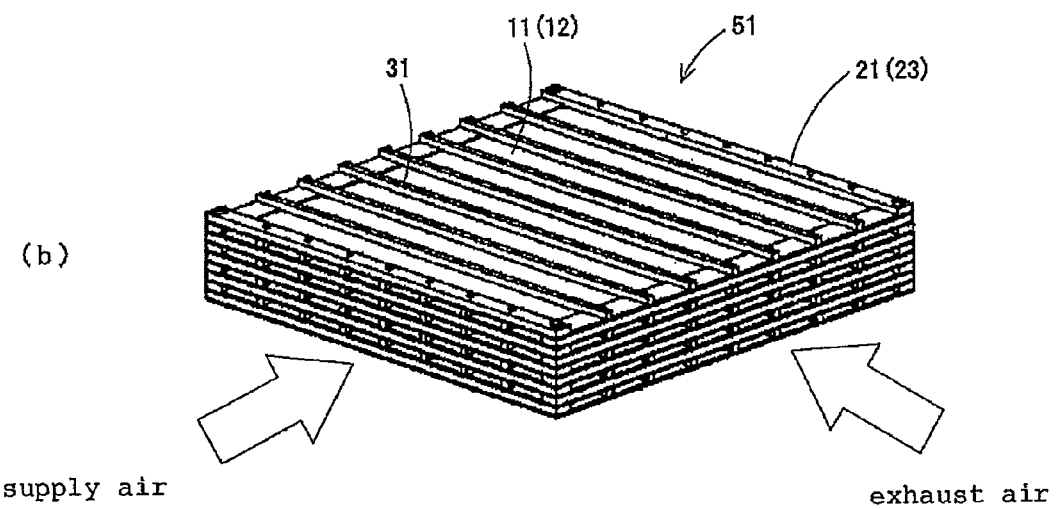
Figure 2:
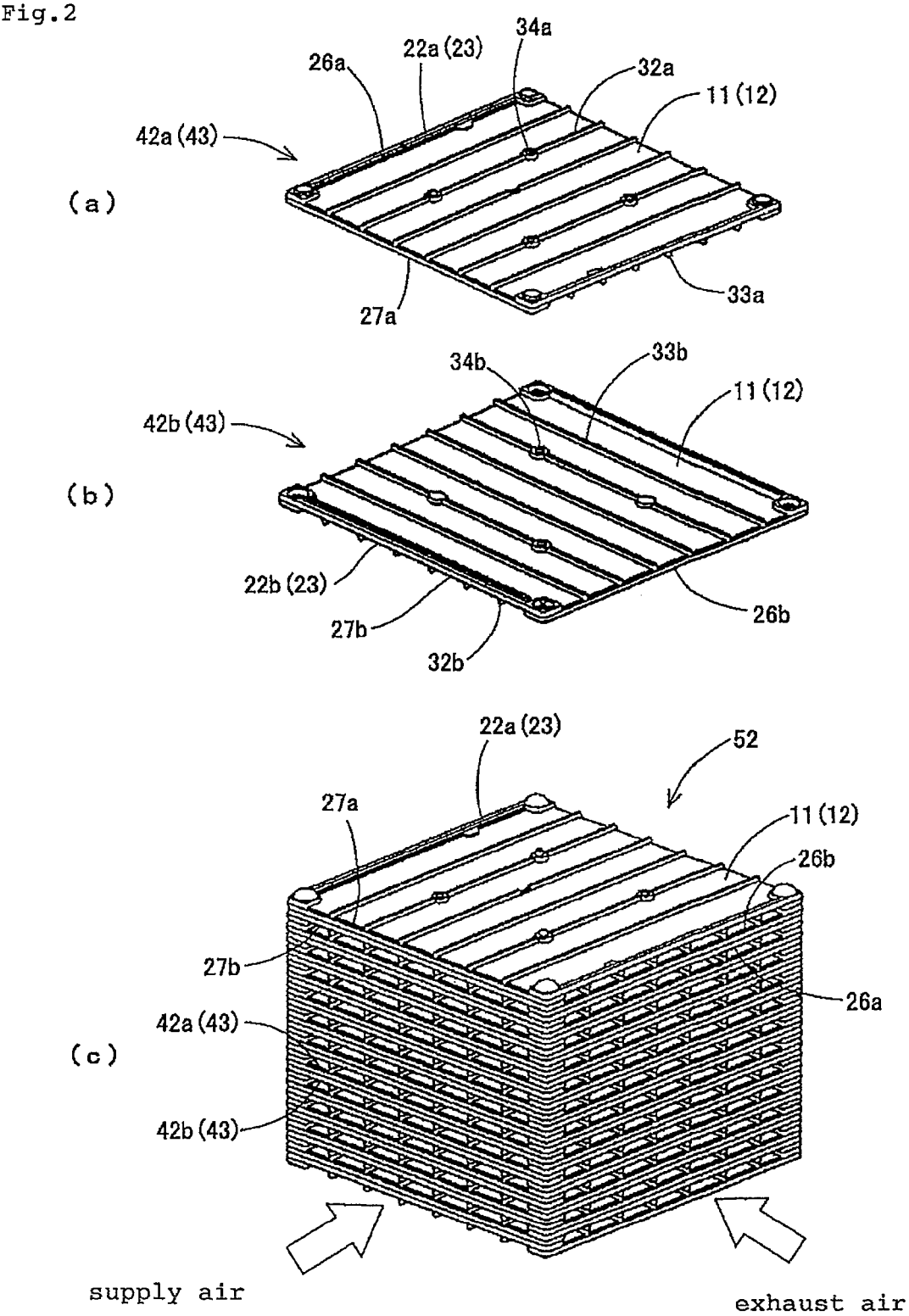
FIG. 2 is a schematic perspective view showing another example of the shape of a frame body which can be produced in the present invention.

The shape of the frame body 23 may also appropriately be designed depending on the applications of the molded product 43. For example, when the molded product 43 is used as a heat-exchange membrane molded product, a frame body may include two or more spacers formed on one or both sides of the film 12 as shown in FIGS. 1 and 2, and portions of the frame body, which are parallel to the spacers, usually have thicknesses substantially the same as (or greater than) those of the spacers. When the spacers are formed on both sides of the film 12, the resin is injected through the molds on both sides of the film 12.

EXAMPLES

The present invention will be described below more specifically by reference to examples, but the present invention is not limited to the following examples. The present invention can be put into practice after appropriate modifications or variations within a range meeting the gist described above and below, all of which are included in the technical scope of the present invention.

Example 1

A urethane adhesive was transferred in a dotted manner to a moisture-permeable film obtained by coating an expanded porous polytetrafluoroethylene film having an average pore diameter of 0.2 μm, a porosity of 80%, and a thickness of 20 μm, with a moisture-permeable urethane resin with a coating amount of 8 g/m$^2$; and a polyvinyl alcohol nonwoven fabric (available from Shinwa Corp., product name "9040-E") was layered and adhered to the moisture-permeable film.

An ABS resin frame body was formed by setting the thermally-laminated film in a vertical injection molding machine available from Nissei Plastic Industrial Co., Ltd. (model: TH100R12VSE), and carrying out insert molding. The molding conditions were as follows: preliminary drying: 3 hours, 90° C., cylinder setting temperature: 240° C., the number of screw rotations: 90 rpm, back pressure: 20 MPa, and mold temperature: 60° C. The injection-molded product was immersed in water at a temperature of 25° C. for 5 minutes and then washed by running water. Thus, a molded product was obtained in which the moisture-permeable film is bonded solely to the resin frame body.

Comparative Example 1

Insert molding was carried out in the same manner as described in Example 1. The polyvinyl alcohol nonwoven fabric layered on the moisture-permeable film was left untouched without being washed by running water.

The molded products obtained in Example 1 and in Comparative Example 1 were measured for moisture permeability in accordance with JIS L1099 method A-1 (conditions: 25° C. and 75% RH). The measurements were carried out three times, and the average values were calculated. The results are shown in Table 1.

TABLE 1

|  | Moisture permeability (Calcium chloride method, 25° C., 75% RH) |
| --- | --- |
|  | g/m$^2$·h |
| Comparative Example 1 | 85.7 |
| Example 1 | 96.3 |
| Moisture-permeable film | 98.0 |

As compared with the molded product of Comparative Example 1, the molded product of Example 1 has higher moisture permeability, which is comparable to the moisture permeability of the moisture-permeable film onto which the polyvinyl alcohol nonwoven fabric has yet to be thermally laminated.

INDUSTRIAL APPLICABILITY

The molded product 43 produced in the present invention can be used for various applications, such as filters (including vent filters), gas-liquid separation membranes, dehumidification membranes, moistening membranes, pervaporation membranes, heat-exchange membranes, and ion-exchange membranes, by appropriately changing the material of the film 12 and the shape of the frame body 23.

EXPLANATION OF NUMERALS

12 Film
15 Reinforcing layer
16 Reinforced film
23 Resin frame body
61, 71 Injection mold
43 Molded product

What is claimed is:
1. A process for producing a molded product comprising a film bonded to a resin frame body, said process comprising:
reinforcing the film with a solvent-soluble or solvent-disintegrable reinforcing layer;
inserting the reinforced film in an injection mold;
feeding a resin to the mold to attach a frame body to the reinforced film while injection molding the resin frame; and
treating the resulting injection molded product with a solvent to remove the reinforcing layer wherein the film is a porous expanded polytetrafluoroethylene film.

2. The process for producing a molded product according to claim 1, wherein a moisture-permeable resin is combined with the expanded porous polytetrafluoroethylene film.

3. The process for producing a molded product according to claim 2, wherein the moisture-permeable resin is selected from the group consisting of urethane resins, cross-linked polyvinyl alcohols and ion exchange fluororesins.

4. The process for producing a molded product according to claim 1, wherein the film has a thickness from about 0.5 μm to about 100 μm.

5. The process for producing a molded product according to claim 1, wherein the solvent is water and the reinforcing layer is formed of a water-soluble fiber.

6. The process for producing a molded product according to claim 1, wherein the solvent is water, and
wherein the reinforcing layer is a formed product of a polyvinyl alcohol fiber or a paper formed of a pulp fiber capable of being finely dispersed in water.

7. The process for producing a molded product according to claim 1, wherein the film reinforced with a reinforcing layer is inserted between a pair of molds for injection molding, each said mold being provided with a first cavity and a second cavity for formation of a frame body, and
wherein each said mold is provided an engraved mold surface on an inner side of each said mold between said first cavity and said second cavity.

8. A process for producing a molded product comprising a film bonded to a resin frame body, said process comprising:
reinforcing the film with a solvent-soluble or solvent-disintegrable reinforcing layer;
inserting the reinforced film in an injection mold;
feeding a resin to the mold to attach a frame body to the reinforced film while injection molding the resin frame; and
treating the resulting injection molded product with a solvent to remove the reinforcing layer,
wherein the solvent is water and the reinforcing layer is formed of a water-soluble fiber.

9. A process for producing a molded product comprising a film bonded to a resin frame body, said process comprising:
reinforcing the film with a solvent-soluble or solvent-disintegrable reinforcing layer;
inserting the reinforced film in an injection mold;
feeding a resin to the mold to attach a frame body to the reinforced film while injection molding the resin frame; and
treating the resulting injection molded product with a solvent to remove the reinforcing layer,
wherein the solvent is water, and
wherein the reinforcing layer is a formed product of a polyvinyl alcohol fiber or a paper formed of a pulp fiber capable of being finely dispersed in water.

* * * * *